(12) United States Patent
Ohta et al.

(10) Patent No.: US 10,603,926 B2
(45) Date of Patent: Mar. 31, 2020

(54) IMAGE FORMING APPARATUS

(71) Applicant: CANON KABUSHIKI KAISHA, Tokyo (JP)

(72) Inventors: Hideki Ohta, Numazu (JP); Kazushi Suzuki, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/925,476

(22) Filed: Mar. 19, 2018

(65) Prior Publication Data

US 2018/0281430 A1    Oct. 4, 2018

(30) Foreign Application Priority Data

Mar. 31, 2017 (JP) ................. 2017-070098
Feb. 1, 2018 (JP) ................. 2018-016245

(51) Int. Cl.
| | |
|---|---|
| *B41J 3/60* | (2006.01) |
| *B41J 29/02* | (2006.01) |
| *B41J 29/13* | (2006.01) |
| *B41J 13/00* | (2006.01) |
| *H04N 1/028* | (2006.01) |
| *H04N 1/00* | (2006.01) |
| *H04N 1/203* | (2006.01) |
| *H04N 1/03* | (2006.01) |

(52) U.S. Cl.
CPC ............. *B41J 3/60* (2013.01); *B41J 13/009* (2013.01); *B41J 29/02* (2013.01); *B41J 29/13* (2013.01); *H04N 1/0053* (2013.01); *H04N 1/0062* (2013.01); *H04N 1/00522* (2013.01); *H04N 1/00525* (2013.01); *H04N 1/00588* (2013.01); *H04N 1/00591* (2013.01); *H04N 1/00602* (2013.01); *H04N 1/00612* (2013.01); *H04N 1/00615* (2013.01); *H04N 1/00631* (2013.01); *H04N 1/0285* (2013.01); *H04N 1/02865* (2013.01); *H04N 1/03* (2013.01); *H04N 1/2032* (2013.01); *H04N 2201/0094* (2013.01)

(58) Field of Classification Search
CPC .. H04N 1/203; H04N 1/2032; H04N 1/00588; H04N 1/00525; H04N 1/00602; H04N 1/00631; H04N 1/00591; H04N 1/0062; H04N 2201/0094; H04N 1/03; H04N 1/0053; H04N 1/0058; H04N 1/00615; H04N 1/02865; H04N 1/00522; B41J 29/393; B41J 13/009; B41J 29/02; B41J 29/13; B41J 3/60
USPC ............................. 347/14, 19, 104
See application file for complete search history.

(56) References Cited

U.S. PATENT DOCUMENTS

| | | | |
|---|---|---|---|
| 8,087,658 B2 * | 1/2012 | Ohtsuki | B65H 5/26 271/162 |
| 8,857,959 B2 | 10/2014 | Ishida et al. | |
| 9,203,994 B2 * | 12/2015 | Kato | H04N 1/00525 |
| 2014/0203499 A1 | 7/2014 | Lo | |

* cited by examiner

*Primary Examiner* — Jannelle M Lebron
(74) *Attorney, Agent, or Firm* — Canon U.S.A., Inc. IP Division

(57) ABSTRACT

An image forming apparatus in which at least part of an image scanner is disposed in an area below an original discharge unit and above an image forming unit.

9 Claims, 8 Drawing Sheets

IMAGE FORMING APPARATUS

BACKGROUND OF THE INVENTION

Field of the Invention

The present disclosure relates to image forming apparatuses that form an image on a recording material using an ink-jet printing method, and in particular, to an image forming apparatus also having a function of reading an image on an original.

Description of the Related Art

An example of an apparatus for forming an image on recording paper is an image forming apparatus including an ink-jet image forming unit. Low-productive image forming apparatuses commonly include a serial recording head, and when the image printing position of the recording paper reaches the image forming unit, the conveyance of the recording paper is stopped, and the recording head moves in a direction perpendicular to the recording-paper conveying direction to form an image. Thereafter, the recording paper is conveyed by the width of the recording head, and the recording head is again moved in the widthwise direction to form an image. By repeating this operation, images are formed over the entire recording paper.

In contrast, an image forming apparatus including a line-head recording head is known from the viewpoint of improving productivity, as disclosed in US Patent Application Publication No. 2014/0203499. In the line-head image forming unit, recording heads are disposed across the width of recording paper being conveyed, so that images can be formed while the recording paper is continuously conveyed. Thus, line-head image forming apparatuses have higher production efficiency than serial-head image forming apparatuses. Furthermore, high-productive image forming apparatuses are suitable for mass printing. For that purpose, image forming apparatuses are increased in paper feed capacity and discharge capacity by increasing the heights of the paper feed tray and the output tray.

For such image forming apparatuses equipped with an ink-let image forming unit, a demand for multifunction printers (MFPs) with original copy and scan functions is increasing, as disclosed in U.S. Pat. No. 8,857,959 B2. Such image forming apparatuses include an image scanning unit on the top of their main bodies. The image scanning unit includes an original base plate and an automatic document feeder (ADF) so as to scan an original on the original base plate with an image scanner and to scan an original being fed with the ADF.

However, the configuration disclosed in U.S. Patent Application Publication No. 2014/0203499 requires a large number of times of replenishment of recording paper and a large number of times of removal of stacked recording paper in processing a mass printing job because of the small paper feed capacity and discharge capacity. Therefore, the configuration is not suitable for mass printing even if the production efficiency is improved.

In the configuration disclosed in U.S. Pat. No. 8,857,959 B2, since the image scanning unit is disposed on the top of the image forming apparatus, the height of the apparatus including the image forming apparatus and the image scanning unit is larger than the height of a single function printer (SFP) including no image scanning unit, resulting in a large apparatus.

SUMMARY OF THE INVENTION

The present disclosure provides a compact image forming apparatus including an ink-jet image forming unit and even with an image scanning unit.

An image forming apparatus includes an image forming unit, a recording-material discharge unit, a conveying path, an openable member, an image scanner, and an original discharge unit. The image forming unit is configured to form an image by ejecting ink onto a recording material. The recording-material discharge unit is configured to discharge the recording material. The conveying path is configured to guide the recording material via the image forming unit to the recording-material discharge unit. The openable member is movable with respect to a body of the image forming apparatus. The openable member is for exposing part of the conveying path. The image scanner is configured to read an image on an original. The original discharge unit is configured to discharge the original. At least part of the image scanner is disposed in an area (i) below the original discharge unit, (ii) above the image forming unit, (iii) at the openable member side with respect to a vertical plane including the recording-material discharge unit, and (iv) at the recording-material discharge unit side with respect to a vertical plane including a hinge of the openable member.

An image forming apparatus includes an image forming unit, a recording-material discharge unit, an image scanner, and an original discharge unit. The image forming unit is configured to form an image by ejecting ink onto a recording material. The recording-material discharge unit is configured to discharge the recording material. The image scanner is configured to read an image on an original. The original discharge unit is configured to discharge the original. In a longitudinal direction of the image scanner, at least part of the image scanner is disposed in an area below the original discharge unit and above the image forming unit. The area corresponds to a width of the image forming unit in a lateral direction of the image scanner.

Further features and aspects of the present disclosure will become apparent from the following description of numerous example embodiments with reference to the attached drawings.

DESCRIPTION OF THE EMBODIMENTS

Numerous embodiments and aspects of the present disclosure will be described in detail hereinbelow with reference to the drawings. It is to be understood that the sizes, materials, shapes, and relative positions of the components described in the following embodiments can be changed as appropriate according to the configuration of an apparatus to which the present disclosure is applied and various conditions and that the scope of the present disclosure is not limited thereto.

First Example Embodiment

Figure 1:
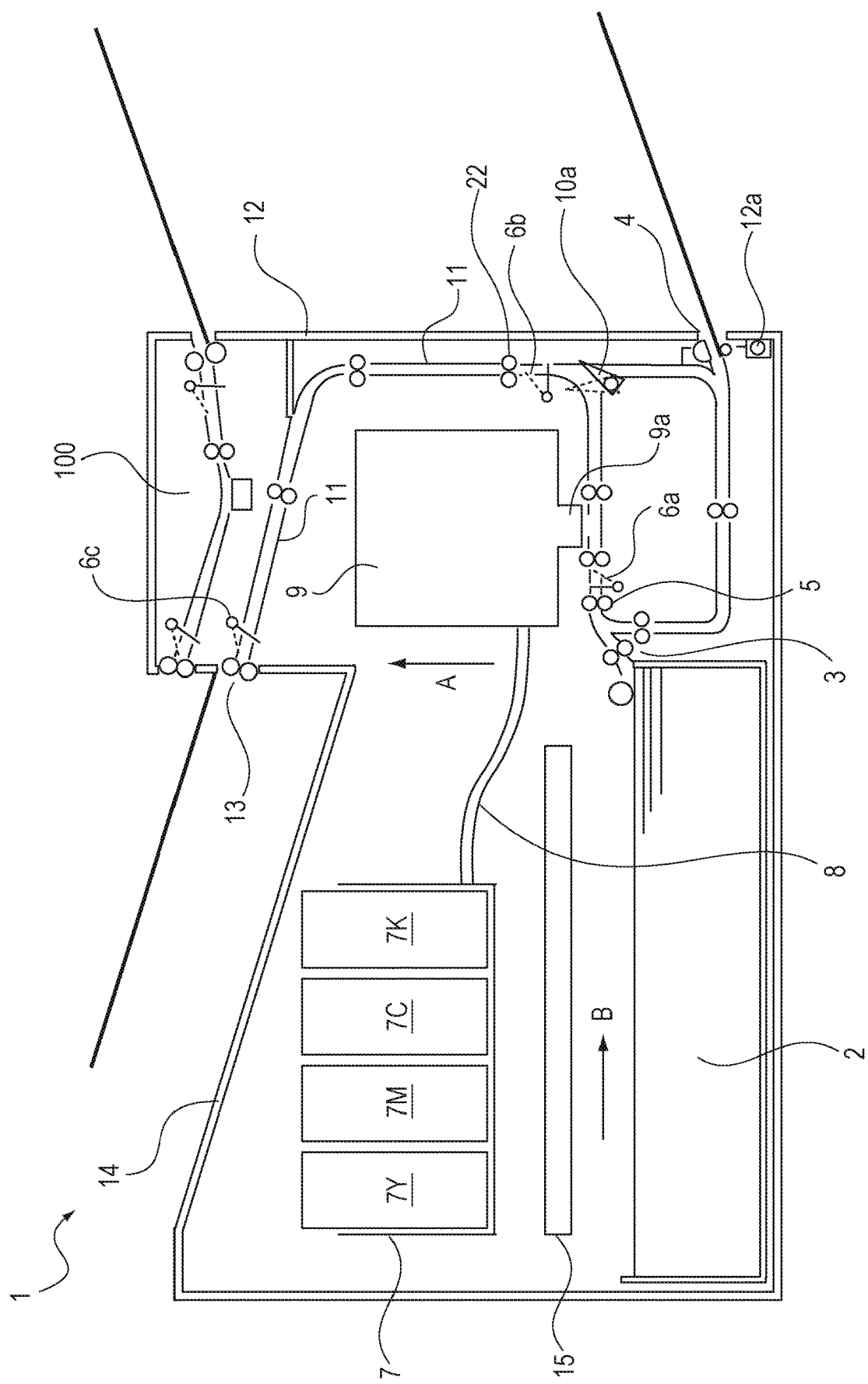
FIG. 1 is a main cross-sectional view of an image forming apparatus according to a first example embodiment of the present disclosure.

Referring to FIG. 1, an image forming apparatus 1 according to a first example embodiment will be described. In the present embodiment, a full-color ink-jet printer including a plurality of ink tanks is illustrated as an example of an image forming apparatus using an ink-jet printing method. This is given for mere illustration and is not intended to limit the present disclosure. The present disclosure is also applicable to a monochrome ink-jet printer including one ink tank. Thus, the present disclosure is not limited to the full-color ink-jet printer. FIG. 1 is a main cross-sectional view of the image forming apparatus 1 illustrating the overall configuration thereof.

The image forming apparatus 1 houses a cassette 2, at the lower part, for containing recording materials (for example, paper or cloth), which are sheets to be printed, so as to be drawn. A cassette feed unit 3 serving as a recording-material feeding unit is disposed in the vicinity of an end of the cassette 2. In the present embodiment, a pair of rollers constitute the cassette feed unit 3. A manual feed unit 4 for feeding recording materials, which are sheets to be recorded, is disposed at the right-hand portion of the image forming apparatus 1. In the present embodiment, a semicircular roller constitutes the manual feed unit 4. The cassette feed unit 3 and the manual feed unit 4 each separate the recording materials one by one and feed the recording materials to a registration roller 5. A conveyance sensor 6a for detecting passage of the recording material is disposed downstream from the registration roller 5 in the recording-material conveying direction. The conveyance sensor 6a detects that the recording material is properly conveyed by being pushed up by the recording material into a position indicated by the dotted line in FIG. 1.

The image forming apparatus 1 includes an image forming unit 9. The image forming unit 9 forms an image on a recording material, which is a recording target sheet. The image forming unit 9 includes an ink-jet recording head 9a that ejects ink onto a recording material (a recording target sheet). The recording head 9a is a line-head type recording head disposed across the width of the recording material perpendicular to the recording-material conveying direction. The line-head type recording head is capable of forming images while the recording material is continuously conveyed. Therefore, its production efficiency is higher than that of a serial head type that performs printing while moving in the width direction of the recording material. The recording head 9a is supplied with ink from ink tanks 7Y, 7M, 7C, and 7K respectively corresponding to yellow, magenta, cyan, and black.

The recording material that has passed through the image forming unit 9 is guided by a switching member 10a at a position indicated by the solid line and is guided to the upper part of the image forming apparatus 1 through a conveying path 11. The conveying path 11 guides a recording material fed from the cassette 2 by the cassette feed unit 3 or a recording material fed by the manual feed unit 4 to a discharge roller pair 13 via the image forming unit 9.

Figure 2:
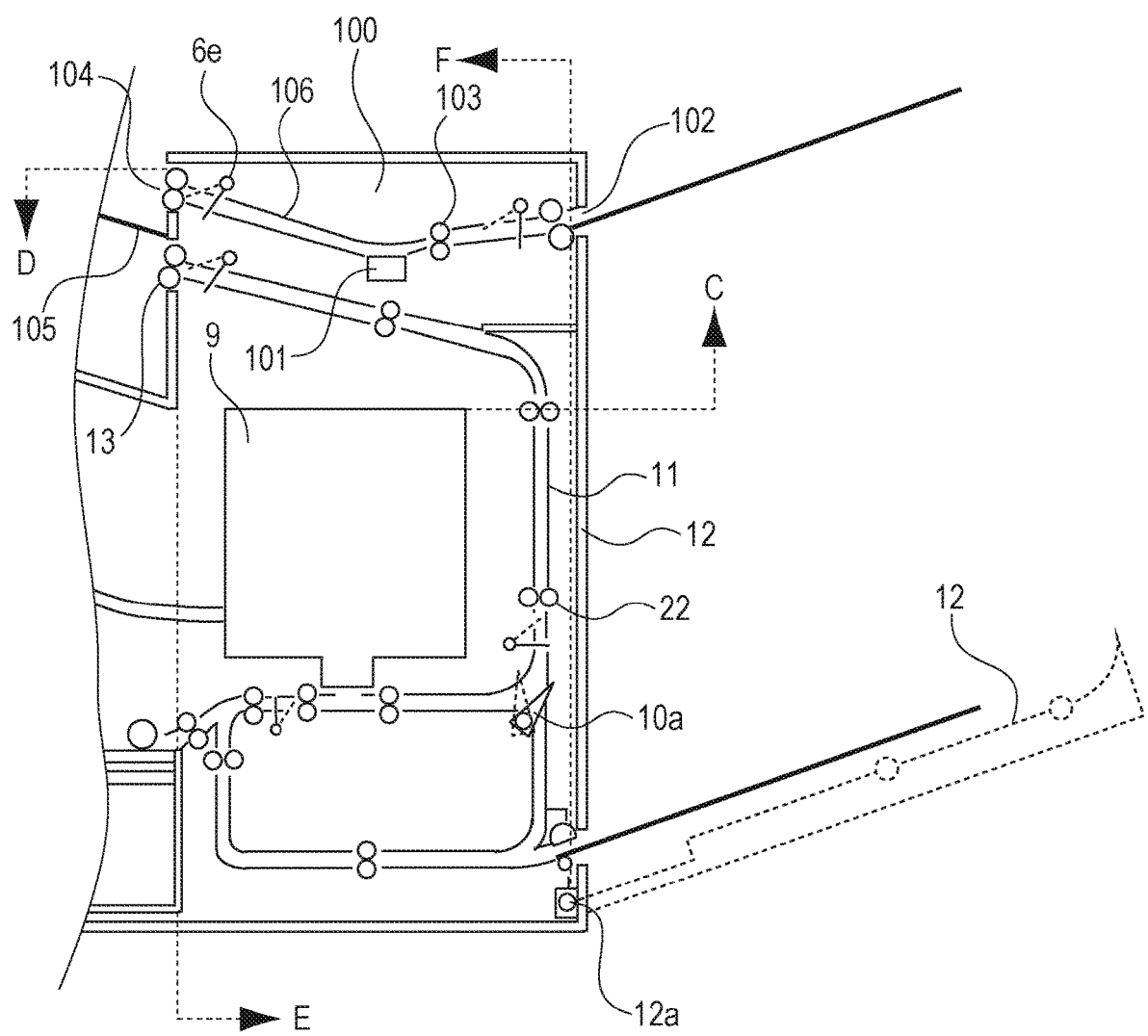
FIG. 2 is an enlarged cross-sectional view of the vicinity of a conveying path and an image scanning unit of the first example embodiment.

An openable member 12 capable of exposing the conveying path 11 is disposed on the right side of the image forming apparatus 1. The openable member 12 includes a hinge 12a, which is supported by the image forming apparatus so as to be capable of opening the openable member 12, and rotates about the hinge 12a. FIG. 2 is an enlarged cross-sectional view of the vicinity of the conveying path 11 and the image scanning unit 100. As illustrated in FIG. 2, the inner surface of the openable member 12 also serves as the conveying path 11 in the closed state indicated by the solid line. When the conveying path 11 is to be exposed, the openable member 12 opens to the position indicated by the dotted line.

When an image is to be formed on only one side of a recording material, the recording material passes through the image forming, unit 9 and then the conveying path 11, which is inclined so that the recording material passes through the shortest path. After the recording material is detected by a conveyance sensor 6c, the recording material is discharged to a recording-paper stack unit 14 by the discharge roller pair 13. The discharge roller pair 13 is recording-material discharge unit that discharges the recording material on which an image is formed in the image forming unit 9. When images are to be formed on both sides of a recording material, a conveyance sensor 6b is pushed up by the recording material in which an image is formed on one side into the position indicated by the dotted line in FIG. 1, so that the conveyance sensor 6b detects that the trailing end of the recording material has passed through the switching member 10a. The switching member 10a is then switched from the position indicated by the solid line to the position indicated by the dotted line, and the recording material that has passed through the switching member 10a is reversely conveyed so that the trailing end is reversed to the leading end by a switch back roller pair (a reversing unit) 22. The recording material in which an image is formed on one side is guided toward the lower part of the image forming apparatus 1 by the switching member 10a and is guided to the registration roller 5 and the image forming unit 9 again. Thereafter, the recording material in which an image is formed also on the other side by the image forming unit 9 is guided to the discharge roller pair 13 and is discharged to the recording-paper stack unit 14.

The image forming apparatus 1 includes a head cleaner 15, which is not activated during printing, above the cassette 2. When the recording head 9a clogs, the image forming unit 9 moves in the direction of arrow A, and the head cleaner 15 moves in the direction of arrow B. When the head cleaner 15 enters the bottom of the recording head 9a, the recording head 9a is cleaned by the head cleaner 15, so that the clogging is eliminated.

Next, the image scanning unit 100 and its scanning operation will be described. As illustrated in FIG. 2, the image scanning unit 100 is disposed above the image forming unit 9 in the image forming apparatus 1. The image scanning unit 100 includes an image scanner 101 that scans an image on an original, which is a sheet to be scanned. An original feeding, unit 102 that feeds an original and an original registration roller 103 are disposed on the right of the image scanner 101 (upstream in the original conveying direction). The original feeding unit 102 of the present embodiment includes a pair of rollers. An original discharge roller pair (an original discharge unit) 104 and an original stack unit 105 are disposed on the left of the image scanner 101 (downstream in the original conveying direction). Thus, an original conveying path 106 that guides the original fed by the original feeding unit 102 to the original discharge roller pair 104 via the image scanner 101 is formed.

Figure 3:
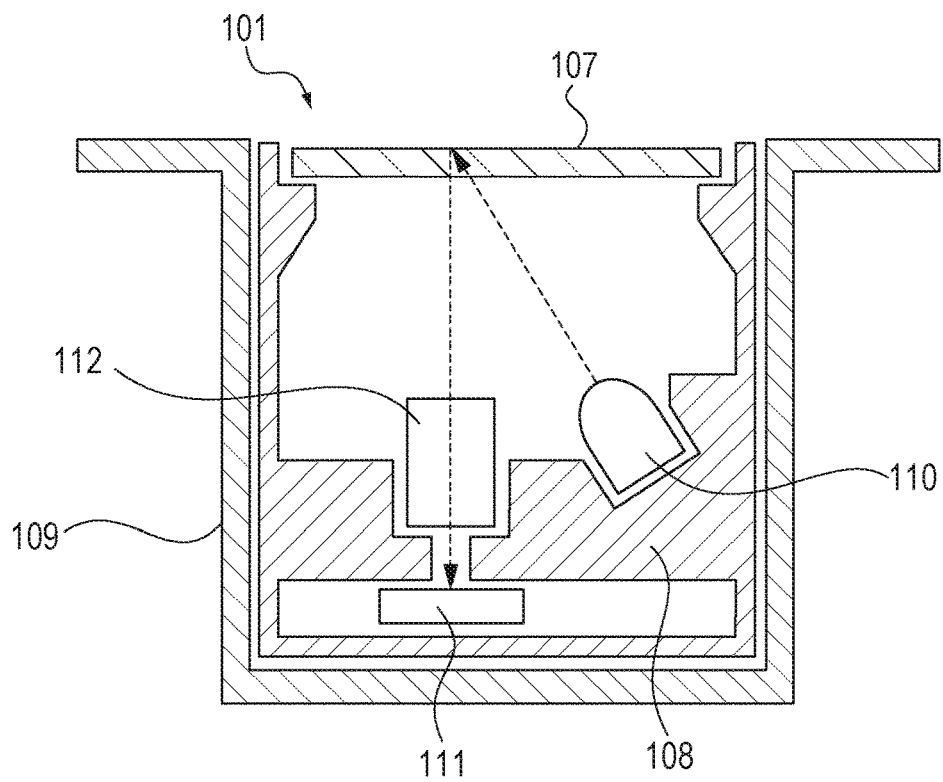
FIG. 3 is an enlarged cross-sectional view of an image scanner of the first example embodiment.
Figure 4:
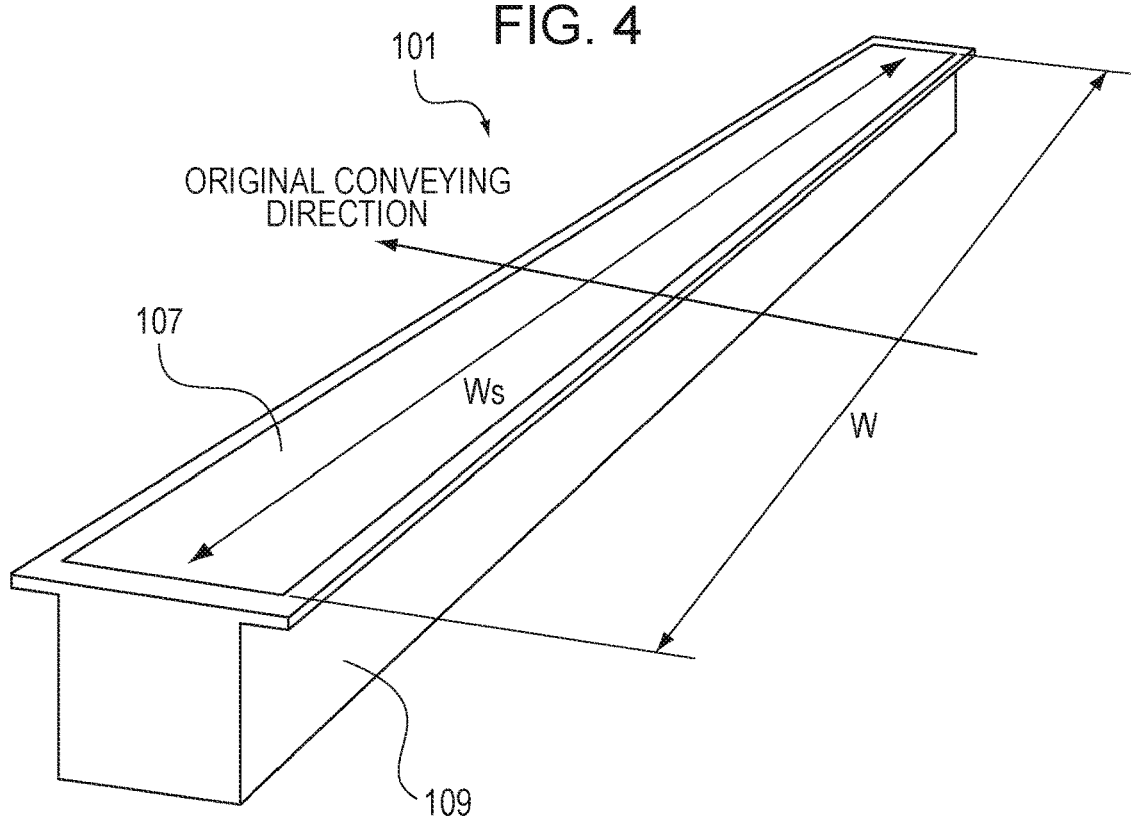
FIG. 4 is a perspective view of the image scanner of the first example embodiment.

FIG. 3 is a cross-sectional view of the image scanner 101. As illustrated in FIG. 3, the image scanner 101 includes a scanning surface member 107 made of a permeable material, such as glass, a holder 108, a housing 109, an LED array 110 arrayed in the widthwise direction of the original, a rod lens 112, and a light receiving element 111. The image scanner 101 is fixed to the image forming apparatus 1. As illustrated in FIG. 4, the scanning surface member 107 is longer in the width (length) W perpendicular to the original conveying direction than the width Ws of paper that can be conveyed (Ws<W).

The original feeding unit 102 separates stacked originals one by one and feeds it to the original registration roller 103. The original conveyed to the original registration roller 103 is then conveyed to the image scanner 101. The image scanner 101 scans the image on the original while the original passes therethrough. When the original comes into contact with the scanning surface member 107, light emitted from the LED array 110 passes through the irradiated surface of the scanning surface member 107 onto the surface of the original. The reflected light is collected by the rod lens 112 and is input to the light receiving element 111. The light receiving element 111 reads the image on the original by converting the input light into a voltage to convert the information on the surface of the original to an electrical signal into image data. The original from which the image is read is conveyed to the original discharge roller pair 104 and is discharged to the original stack unit 105 by the original discharge roller pair 104. The image data read by the image scanner 101 is stored as electronic data in a computer on a network or is converted to print data by a control unit (not shown) and copied to a new recording material fed from the cassette 2.

The original feeding unit 102 is opposed to the original discharge roller pair 104, which is an original discharge unit, with the image scanner 101 therebetween in the horizontal direction.

Next, the disposition of the image scanner 101 in the image forming apparatus 1 will be described in detail. As described above, the conveying path 11 extends from the cassette feed unit 3 at the lower part of the image forming apparatus 1 along a side of the image forming apparatus 1 so as to go around the image forming unit 9 via the recording head 9a of the image forming unit 9. The conveying path 11 guides the recording material toward the discharge roller pair 13 (a recording-material discharge unit) at the upper part of the image forming apparatus 1. Thus, an area defined by the following boundaries is formed, as illustrated in FIG. 2. A first boundary is above a horizontal plane C on the top of the image forming unit 9 defined in height by the image forming unit 9. A second boundary is below a horizontal plane D defined by the original discharge roller pair 104 (an original discharge unit). A third boundary is on the right side of a vertical plane E including the discharge roller pair 13 (a recording-material discharge unit). A fourth boundary is on the lift side of a vertical plane F including the hinge 12a. This area often has no specific function other than the recording material conveying path in the case of a single function printer. For that reason, in the present embodiment, at least part of the image scanner 101 is disposed in this area. In other words, at least part of the image scanner 101 is in the area below the horizontal plane D, the area including the top of the original discharge roller pair 104 (an original discharge unit) and above the horizontal plane C including the top of the image forming unit 9. Furthermore, at least part of the image scanner 101 is in the area at the openable member 12 side (on the right side) with respect to the vertical plane E including the discharge roller pair 13 (a recording-material discharge unit) and at the recording-material discharge unit side (on the left side) with respect to the vertical plane F including the rotation center (the hinge 12a), which is the moving fulcrum of the openable member 12.

Figure 9:
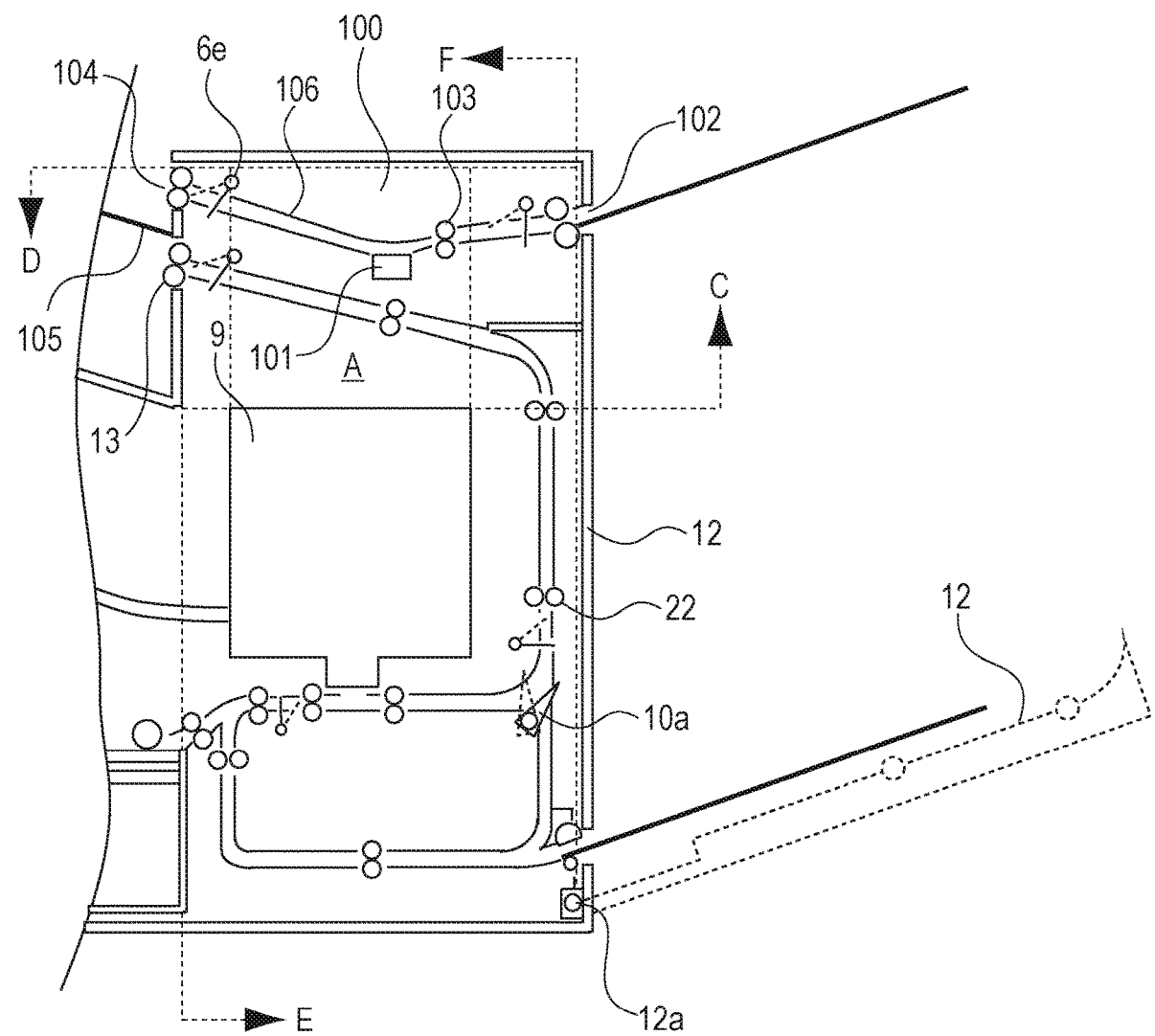
FIG. 9 is an enlarged cross-sectional view of the vicinity f a conveying path and an image scanning unit according to the first example embodiment.

In some embodiments, at least part of the image scanner 101 is disposed in the following area (an area A), as illustrated in FIG. 9. This area A is an area below the original discharge unit 104, above the image forming unit 9 in the longitudinal direction of the image scanner 101 (in the plane of the drawing), and corresponding to the width of the image forming unit 9 in the lateral direction of the image scanner 101.

As described above, by efficiently disposing the image scanner 101 in the above area, a compact image forming apparatus 1 can be provided even when the image scanning unit 100 is disposed in the image forming apparatus 1. Furthermore, since the scanning function can be integrated above the image forming unit 9, functional separation is achieved, offering excellent usability.

In the present embodiment, the openable member 12 is opened and closed about the hinge 12a disposed in a direction perpendicular to the recording-material conveying direction. Alternatively, the openable member 12 may be opened and closed about a hinge 12a having the rotation axis in the height direction.

Second Example Embodiment

Figure 5:
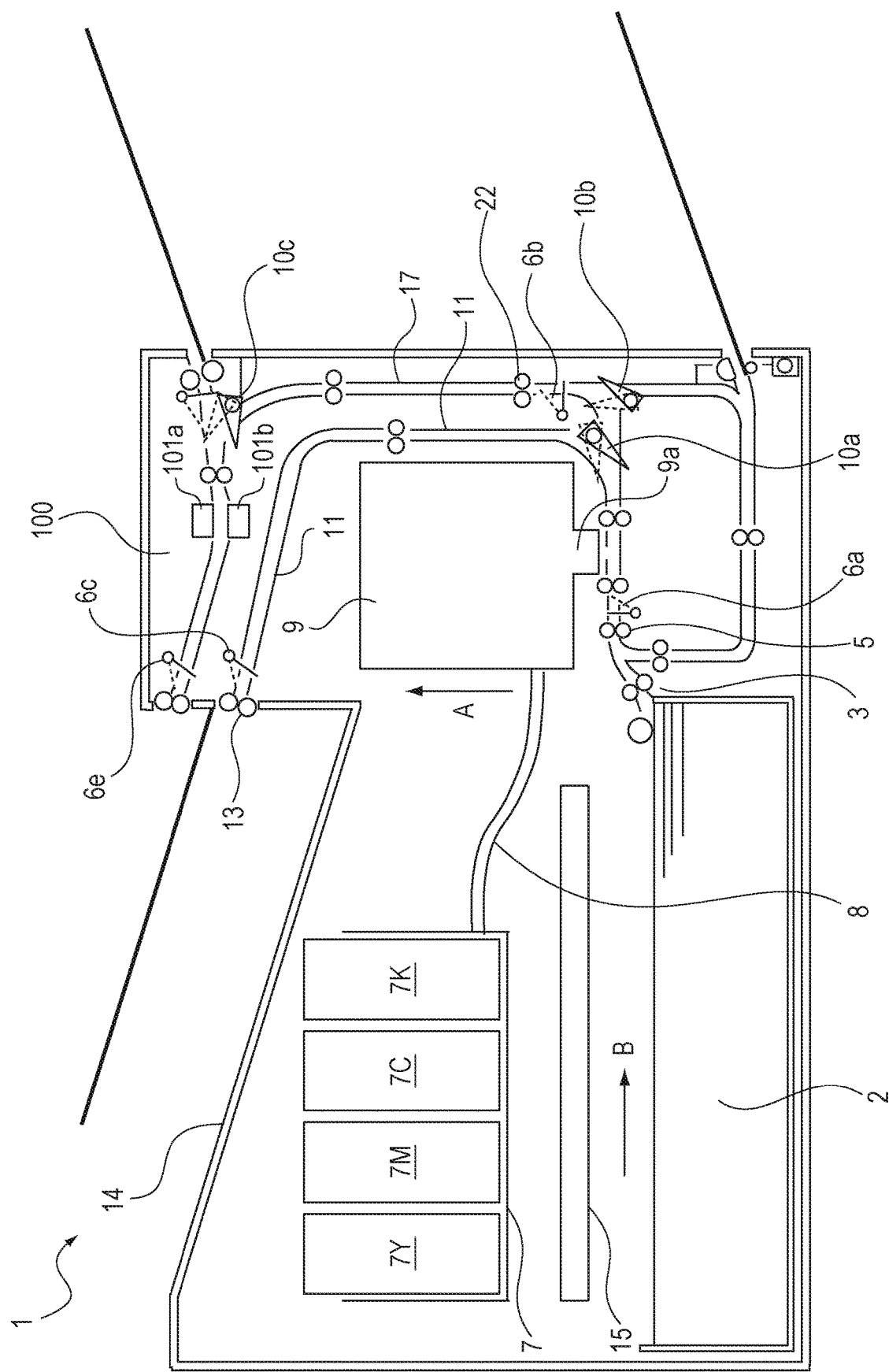
FIG. 5 is a main cross-sectional view of an image forming apparatus according to a second example embodiment of the present disclosure.
Figure 6:
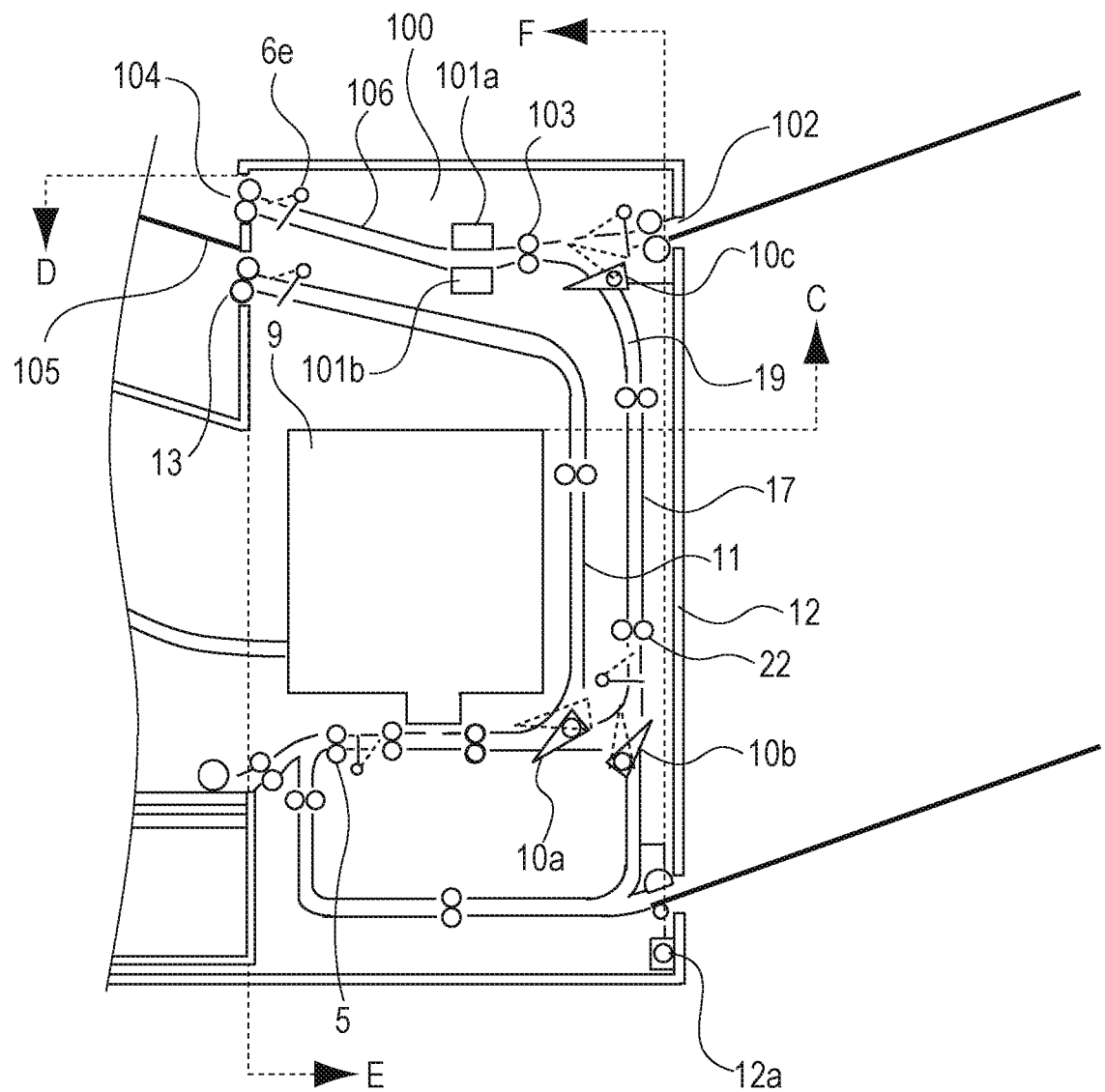
FIG. 6 is an enlarged cross-sectional view of the vicinity f a conveying path and an image scanning unit of the second example embodiment.

Referring next to FIGS. 5 and 6, an image forming apparatus 1 according to a second example embodiment will be described. In the image forming apparatus 1 according to the present embodiment, descriptions of parts overlapping with the first embodiment will be omitted. FIG. 5 is a main cross-sectional view of the image forming apparatus 1 of the present embodiment. FIG. 6 is an enlarged cross-sectional view of the vicinity of the conveying path and the image scanning unit.

In the image forming apparatus 1 according to the present embodiment, a switching member 10b and a double-sided conveying path 17 that conveys a reversed sheet to the image forming unit 9 are disposed on the right side of the conveying path 11. The image forming apparatus 1 further includes a switching member 10c and a first branch 19 that guides the sheet from the original conveying path 106 to the double-sided conveying path 17 upstream from an image scanner 101 on the original conveying path 106.

When an image is to be formed on only one side of the recording material, the recording material that has passed through the image forming unit 9 is guided by the switching member 10a at the position indicated by the solid line, is guided to the upper part of the image forming apparatus 1 by the conveying path 11, and is discharged to the recording-paper stack unit 14 by the discharge roller pair 13. When images are to be formed on both sides of the recording material, the conveyance sensor 6a is pushed up by the recording material into the position indicated by the dotted line in FIG. 5, so that the switching member 10a is switched to the position indicated by the dotted line, and the switching member 10b is switched to the position indicated by the solid line. This causes the recording material in which an image is formed by the image forming unit 9 is guided to the double-sided conveying path 17 by the switching members 10a and 10b. The conveyance sensor 6b is pushed up by the recording material in which an image is formed on one side into the position indicated by the dotted line in FIG. 5, so that the conveyance sensor 6b detects that the trailing end of the recording material has passed through the switching member 10b. As a result, the switching member 10b is switched from the position indicated by the solid line to the position indicated by the dotted line, and the recording material that has passed through the switching member 10b is reversely conveyed by the switch back roller pair (a revering unit) 22 so that the trailing end is reversed to toe leading end. The recording material in which an image is formed on one side is guided to the lower part of the image forming apparatus 1 by the switching member 10b and is guided again to the registration roller 5 and the image forming unit 9. Thus, part of the conveying path 11 also serves as a double-sided conveying path that again conveys the reversed recording material to the image forming unit 9. Thereafter, the recording material in which an image is formed on the other side by the image forming unit 9 is guided to the discharge roller pair 13 and is discharged to the recording-paper stack unit 14.

Next, an example configuration and operation of the image scanning unit 100 will be described. The image scanning unit 100 is disposed above the image forming unit 9 in the image forming apparatus 1. The image scanning unit 100 includes the image scanner 101 for scanning images on an original on both sides of the original conveying path 106. In other words, the image scanning unit 100 includes an upper image scanner 101a for scanning an image on one side of the original and a lower image scanner 101b for scanning an image on the other side of the original. An original feeding unit 102 that feeds an original and an original registration roller 103 are disposed on the right side of the image scanners 101a and 101b (upstream in the original conveying direction). An original discharge roller pair (an original discharge unit) 104 that discharges the original and an original stack unit 105 are disposed on the left side of the image scanners 101a and 101b (downstream in the original conveying direction. Thus, the original conveying path 106 that guides the original fed by the original feeding unit 102 to the original discharge roller pair 104 via the image scanners 101a and 101b is formed. Furthermore, the first branch 19 that guides the original from the original conveying path 106 to the double-sided conveying path 17 is disposed on the right side of the image scanners 101a and 101b.

The image forming apparatus 1 according to the present embodiment is capable of adding and overwriting an image on the original. In this case, first, the original fed from t e original feeding unit 102 is guided to the original registration roller 103 by the switching member 10c at the position indicated by the solid line and is conveyed to the original discharge roller pair 104 via the image scanners 101a and 101b. When a conveyance sensor 6e detects that the trailing end of the original has passed therethrough, the original (the sheet to be scanned) is reversely conveyed by the original discharge roller pair (the reversing unit) 104 so that the trailing end is reversed to the leading end and is again conveyed to the image scanner 101. When the original passes through the image scanner 101, the image scanner 101a on the upper surface of the original reads an image on the original. The original from which the image is read is guided from the original conveying path 106 to the first branch 19 because the switching member 10c is at the position indicated by the dotted line. The original guided from the first branch 19 to the double-sided conveying path 17 is guided to the lower portion of the image forming apparatus 1 because the switching member 10b is at the position indicated by the dotted line. Thereafter, an image is added or overwritten to the image on the original (the sheet to be printed) on the basis of the image information read by the image scanner 101a, and thus image formation is performed. The original that has passed through the image forming unit 9 is guided to the discharge roller pair 13 because the switching member 10a is at the position indicated by the solid line and is discharged to the recording-paper stack unit 14.

The image forming apparatus 1 according to the present embodiment includes an openable member 12 capable of exposing the double-sided conveying path 17. The openable member 12 includes a hinge 12a, which is supported by the main body of the image forming apparatus 1 so as to be capable of opening the openable member 12, and rotates about the hinge 12a. As illustrated in FIG. 6, the inner surface of the openable member 12 also serves as the double-sided conveying path 17 in the closed state indicated by the solid line. When the double-sided conveying path 17 is to be exposed, the openable member 12 is opened (not shown) as is the openable member 12 of the first embodiment (the position indicated by the dotted line in FIG. 2). When the openable member 12 is opened, the inside, which is part of the double-sided conveying path 17, is exposed.

Next, the disposition of the image scanners 101a and 101b in the image forming apparatus 1 will be described. In the present embodiment, at least part of the image scanners 101a and 101b is disposed in the following area. In other words, at least part of the image scanners 101a and 101b is disposed in an area above a horizontal plane C defined by the image forming unit 9 and below a horizontal plane D defined by the original discharge roller pair 104 in the heightwise direction, and at the openable member 12 side (on the right side) with respect to a vertical plane E defined by the discharge roller pair 13 and at the discharge roller pair 9 side (on the left side) with respect to a vertical plane F defined by the hinge 12a of the openable member 12 in t e horizontal direction.

At least part of the image scanner 101 may be disposed in the same area (area A) as in the first embodiment. This area A is an area below the original discharge unit 104, above the image forming unit 9 in the longitudinal direction of the image scanner 101, and corresponding to the width of the image forming unit 9 in the lateral direction of the image scanner 101.

The image forming apparatus 1 described above is capable of adding and overwriting an image on the original By providing the double-sided conveying path 17, production efficiency in double-sided printing is improved. Furthermore, the image forming apparatus 1 of the present embodiment allows scanning the both sides of the original at the same time.

In the case where two image scanners are provided to read the both sides of the original as in the present embodiment, disposing at least part of one of the two image scanners is within the above area suppresses an increase in the size of the image forming apparatus.

Third Example Embodiment

Figure 7:
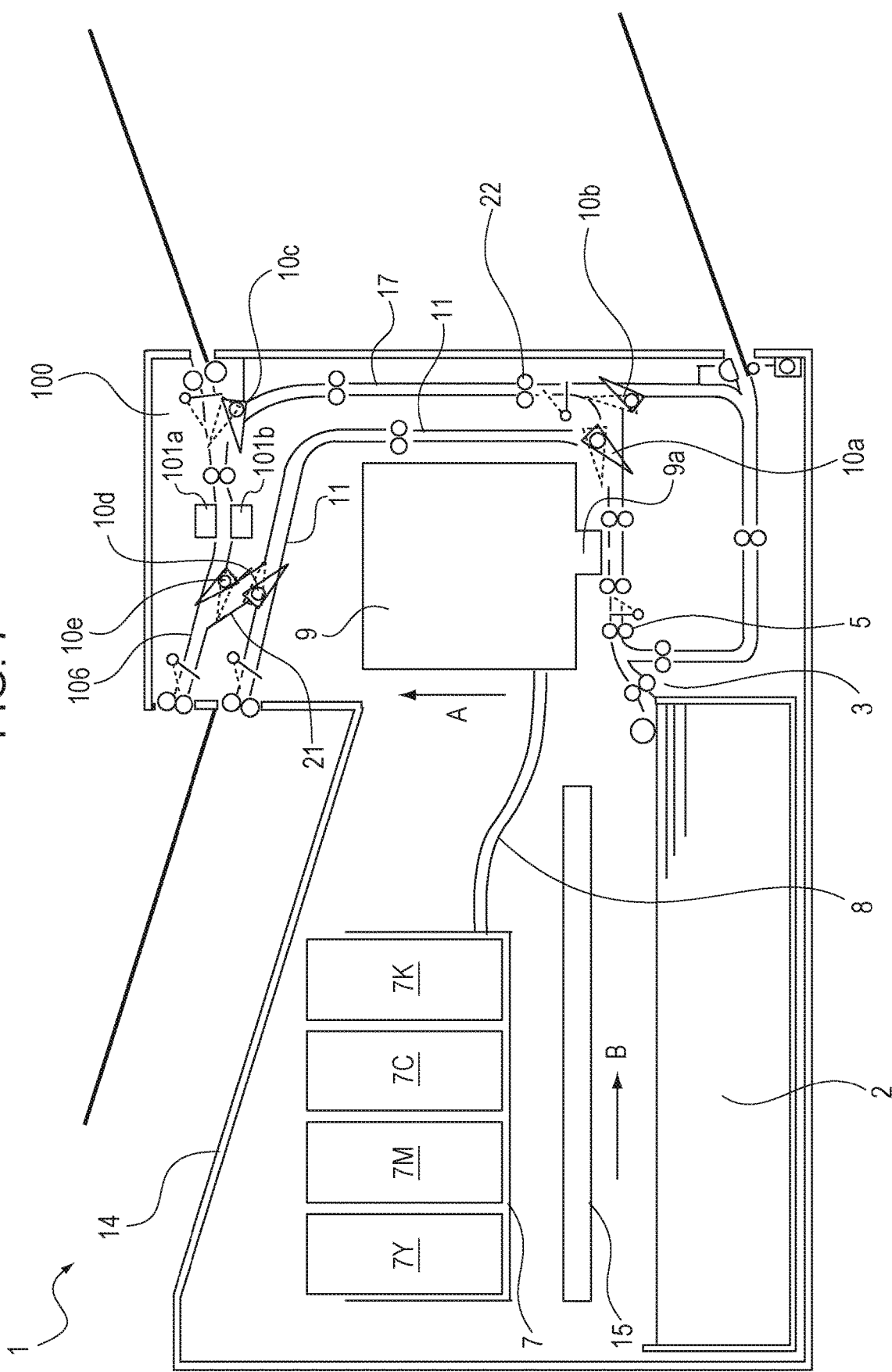
FIG. 7 is a main cross-sectional view of an image forming apparatus according to a third example embodiment of the present disclosure.
Figure 8:
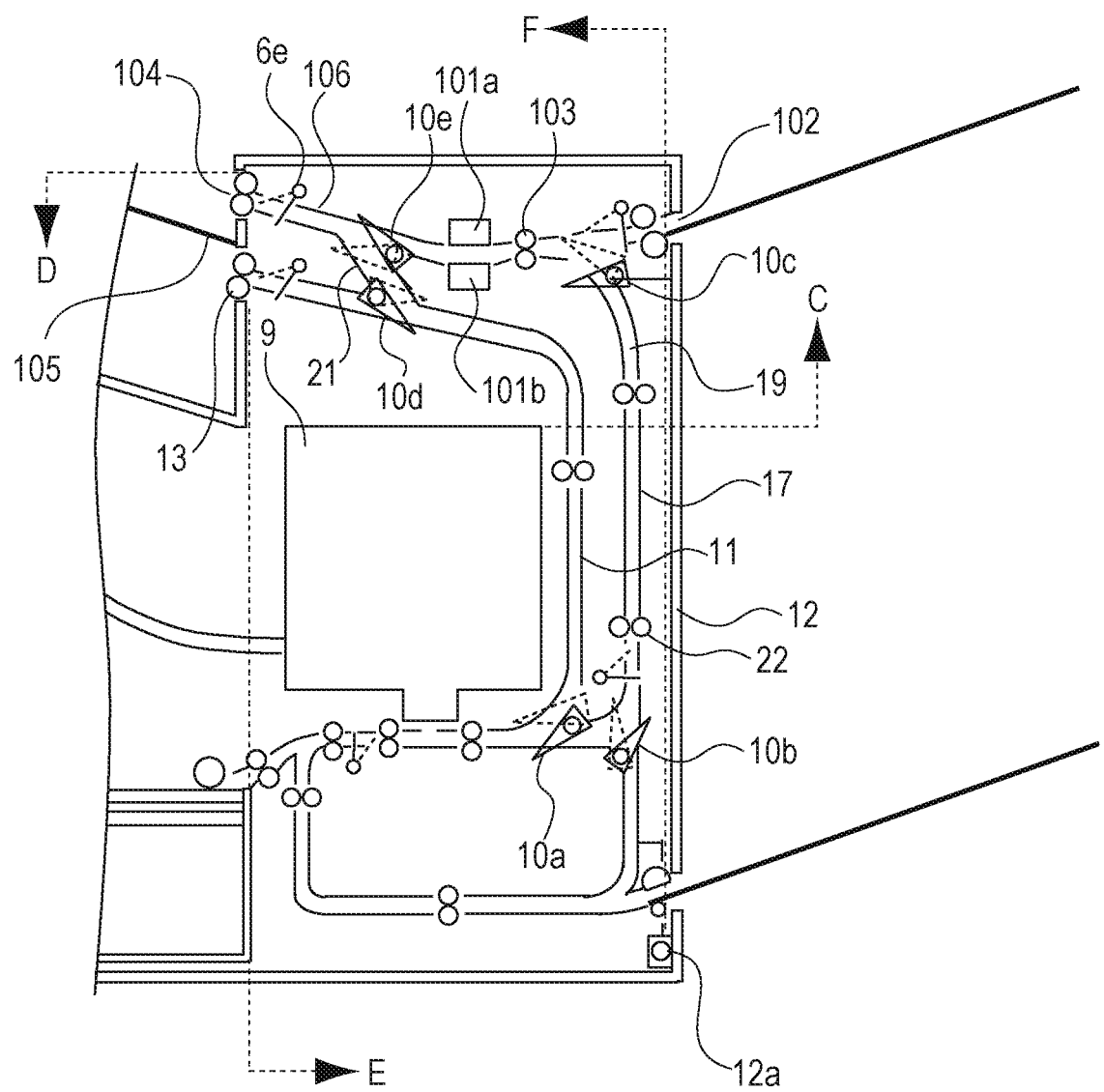
FIG. 8 is an enlarged cross-sectional view of the vicinity f a conveying path and an image scanning unit of the third example embodiment.

Referring next to FIGS. 7 and 8, an image forming apparatus 1 according to a third example embodiment will be described. In the image forming apparatus 1 according to the present embodiment, descriptions of parts overlapping with the first and second example embodiments will be omitted. FIG. 7 is a main cross-sectional view of the image forming apparatus 1 of the present embodiment. FIG. 8 is an enlarged cross-sectional view of the vicinity of the conveying path and the image scanning unit.

The image forming apparatus of the present embodiment includes a switching member 10d, a second branch 21 that guides a sheet from the conveying path 11 to the original conveying path 106, and a switching member 10e upstream from the discharge roller pair 13 on the conveying path 11.

In the present embodiment, an image formed on a recording material can be read and corrected. In this case, an image is formed on the recording material, which is a sheet to be printed, by the image forming unit 9, and the recording material on which the image is formed (the sheet to be scanned) is conveyed to the image scanning unit. First, the recording material on which an image is formed by the image forming unit 9 is conveyed toward the discharge roller pair 13 since the switching member 10a is at the position indicated by the solid line. The recording material is guided from the conveying path 11 to the second branch 21 since the switching member 10d is at the position indicated by the solid line and is then guided from the second branch 21 to the original conveying path 106 since the switching member 10e is at the position indicated by the solid line. When the conveyance sensor 6e detects that the trailing end of the recording material (original) (the sheet to be scanned) has passed therethrough, the recording material is reversely conveyed by the original discharge roller pair (the reversing unit) 104 so that the trailing end is reversed to the leading end and is guided to the image scanner 101 by the switching member 10e switched to the position indicated by the dotted line. The image scanner 101 reads the image information on the recording material, formed in the image forming unit 9, and calculates the difference in color and outline from the image information on the print job with a control unit (not shown) to correct the difference for the subsequent printing operation. The recording material that has passed through the image scanner 101 is guided to the double-sided conveying path 17 through the first branch 19 since the switching member 10c is at the position indicated by the dotted line. Thereafter, the recording material passes through the registration roller 5 and the image forming unit 9, is guided along conveying path 11 by the switching member 10a located at the position indicated by the solid line and the switching member 10d located at the position indicated by the dotted line, and is discharged to the recording-paper stack unit 14 by the discharge roller pair 13.

The disposition of the image scanner 101 in the image forming apparatus 1 according to the present embodiment is the same as that of the second example embodiment, and a description thereof will be omitted here.

As described above, by scanning and correcting an image on a recording material on which the image is formed, an image with high reproducibility of print information can be printed.

In the case where two image scanners are disposed to scan both sides of the original, as in the second example embodiment, at least part of at least one of the two image scanners is disposed in the above-described area, thus preventing an increase in the size of the image forming apparatus.

Other Example Embodiments

In the above embodiments, the image scanner(s) are disposed on the original conveying path. This is given for mere illustration and is not intended to limit the present disclosure. The image scanner(s) may be disposed on least one of the conveying path, the original conveying path, the double-sided conveying path, the first branch, and the second branch. With such a configuration, when at least part of the image scanner(s) is within an area above the horizontal plane C including the image forming unit and below the horizontal plane D including the original discharge roller pair in the heightwise direction, and at the openable member side (on the right side) with respect to the vertical plane E including the discharge roller pair and at the discharge roller pair side (on the left side) with respect to the vertical plane F including the rotation center of the openable member (hinge 12a), the same advantageous effects as those of the above embodiments can be obtained.

While the present disclosure has been described with reference to numerous example embodiments, it is to be understood that the present disclosure is not limited to the disclosed example embodiments. The scope of the following claims is to be accorded the broadest interpretation so as to encompass all such modifications and equivalent structures and functions.

This application claims the benefit of Japanese Patent Application No. 2017-070098, filed Mar. 31, 2017, and No. 2018-016245, filed Feb. 1, 2018, which are hereby incorporated by reference herein in their entirety.

What is claimed is:

1. An image forming apparatus comprising:
    an image forming unit that includes an ink-jet recording head forming an image by ejecting ink onto a recording material;
    a recording-material discharge unit that discharges the recording material on which the image has been formed by the image forming unit;
    a recording-material conveying path that guides the recording material to the recording-material discharge unit via the image forming unit;
    an image scanner that reads an image on an original;
    an original discharge unit that discharges the original read by the image scanner, and
    an original conveying path that guides the original to the original discharge unit,
    wherein at least a part of the image scanner is disposed in an area (i) below the original discharge unit, (ii) above the image forming unit, and the image scanner is provided in a part of the original conveying path overlapping with the image forming unit seen from vertically above.

2. The image forming apparatus according to claim 1, further comprising an original feeding unit that feeds the original,
    wherein the original feeding unit is opposed to the original discharge unit, with the image scanner therebetween in a horizontal direction.

3. The image forming apparatus according to claim 1, further comprising
    a cassette that contains recording materials; and
    an ink tank that supplies ink to the ink-jet recording head, wherein, seen from vertically above, the ink tank is overlap with the cassette.

4. The image forming apparatus according to claim 1, wherein the recording-material discharge unit also serves as the original discharge unit.

5. The image forming apparatus according to claim 1, further comprising:

a reversing unit that reverses a sheet that has passed through the image scanner such that a trailing end is reversed to a leading end; and a double-sided conveying path that again conveys the reversed sheet to the image scanner.

6. The image forming apparatus according to claim 5, wherein part of the recording-material conveying path also serves as the double-sided conveying path.

7. The image forming apparatus according to claim 5, further comprising a first branch that guides a sheet from the original conveying path to the double-sided conveying path.

8. The image forming apparatus according to claim 7, further comprising a second branch that guides a sheet from the recording-material conveying path to the original conveying path.

9. The image forming apparatus according to claim 8, wherein the image scanner is disposed on at least one of the recording-material conveying path, the original conveying path, the double-sided conveying path, the first branch, and the second branch.

* * * * *